(12) United States Patent
Lee et al.

(10) Patent No.: US 9,799,362 B1
(45) Date of Patent: Oct. 24, 2017

(54) THREE DIMENSIONAL DATA STORAGE MEDIUM WITH A TUNED RECORDING LAYER

(71) Applicant: Seagate Technology LLC, Cupertino, CA (US)

(72) Inventors: Kim Yang Lee, Fremont, CA (US); Thomas P. Nolan, Fremont, CA (US); Philip L. Steiner, Los Altos, CA (US); Thomas Y. Chang, Menlo Park, CA (US); Koichi Wago, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/165,615

(22) Filed: May 26, 2016

Related U.S. Application Data

(60) Provisional application No. 62/168,488, filed on May 29, 2015, provisional application No. 62/169,801, filed on Jun. 2, 2015, provisional application No. 62/169,806, filed on Jun. 2, 2015, provisional application No. 62/170,450, filed on Jun. 3, 2015, provisional application No. 62/170,459, filed on Jun. 3, 2015.

(51) Int. Cl.
*G11B 5/66* (2006.01)
*G11B 5/00* (2006.01)

(52) U.S. Cl.
CPC ........ *G11B 5/66* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,566,872 B1 | 5/2003 | Sugitani | |
| 7,241,520 B2 * | 7/2007 | Shin | G11B 5/653 428/836.3 |
| 7,602,588 B2 | 10/2009 | Sato et al. | |
| 8,164,854 B2 | 4/2012 | Takagishi et al. | |
| 8,289,821 B1 | 10/2012 | Huber | |
| 8,514,672 B2 | 8/2013 | Grobis et al. | |
| 8,553,358 B2 | 10/2013 | Mizushima et al. | |
| 8,630,070 B2 | 1/2014 | Sato et al. | |
| 8,634,163 B2 | 1/2014 | Tanabe et al. | |
| 8,891,341 B1 | 11/2014 | Krichevsky et al. | |
| 9,007,720 B2 | 4/2015 | Fukuzawa et al. | |
| 9,030,783 B1 | 5/2015 | Braganca et al. | |
| 2002/0132083 A1 * | 9/2002 | Weller | G11B 5/82 428/845.6 |
| 2004/0071924 A1 * | 4/2004 | Yang | G11B 5/82 428/848.3 |
| 2006/0153976 A1 * | 7/2006 | Ito | B82Y 25/00 427/127 |

(Continued)

*Primary Examiner* — Peter Vincent Agustin
(74) *Attorney, Agent, or Firm* — Hall Estill Attorneys at Law

(57) ABSTRACT

A three dimensional magnetic recording medium can consist of a first recording layer vertically stacked with a second recording layer. The first stacked recording layer may be tuned with at least one discrete track physically separating multiple data tracks in the first recording layer or tuned by being configured as a bit patterned media.

19 Claims, 3 Drawing Sheets

140 ⟶

| | |
|---|---|
| PROTECTIVE OVERCOAT LAYER | 152 |
| SECOND RECORDING LAYER | 150 |
| INTERMEDIATE LAYER | 148 |
| FIRST RECORDING LAYER | 146 |
| SOFT UNDERLAYER (SUL) | 144 |
| SUBSTRATE | 142 |

(56) References Cited

U.S. PATENT DOCUMENTS

| | | | |
|---|---|---|---|
| 2007/0141401 A1* | 6/2007 | Maeda | G11B 5/7325 |
| | | | 428/831.2 |
| 2010/0033872 A1* | 2/2010 | Xi | B82Y 10/00 |
| | | | 360/135 |
| 2011/0085264 A1* | 4/2011 | Hauet | B82Y 10/00 |
| | | | 360/110 |
| 2012/0134049 A1* | 5/2012 | Maeda | G11B 5/82 |
| | | | 360/110 |
| 2012/0147718 A1* | 6/2012 | Hellwig | G11B 5/66 |
| | | | 369/13.33 |
| 2012/0224283 A1 | 9/2012 | Sato et al. | |
| 2015/0213823 A1* | 7/2015 | Uchida | G11B 5/65 |
| | | | 428/846.9 |
| 2015/0248909 A1* | 9/2015 | Gurney | G11B 5/48 |
| | | | 360/75 |

* cited by examiner

THREE DIMENSIONAL DATA STORAGE MEDIUM WITH A TUNED RECORDING LAYER

RELATED APPLICATIONS

The present application makes a claim of domestic priority under 35 U.S.C. §119(e) to U.S. Provisional Application Nos. 62/168,488 filed May 29, 2015, 62/169,801 filed Jun. 2, 2015, 62/169,806 filed Jun. 2, 2015, 62/170,459 filed Jun. 3, 2015 and 62/170,450 filed Jun. 3, 2015, the contents of which are incorporated by reference.

SUMMARY

A three dimensional magnetic recording (3DMR) media can, in accordance with some embodiments, consist of a first recording layer vertically stacked with a second recording layer. The first stacked recording layer is tuned with at least one discrete track physically separating multiple data tracks in the first recording layer or tuned by being configured as a bit patterned media.

DETAILED DESCRIPTION

Figure 1:
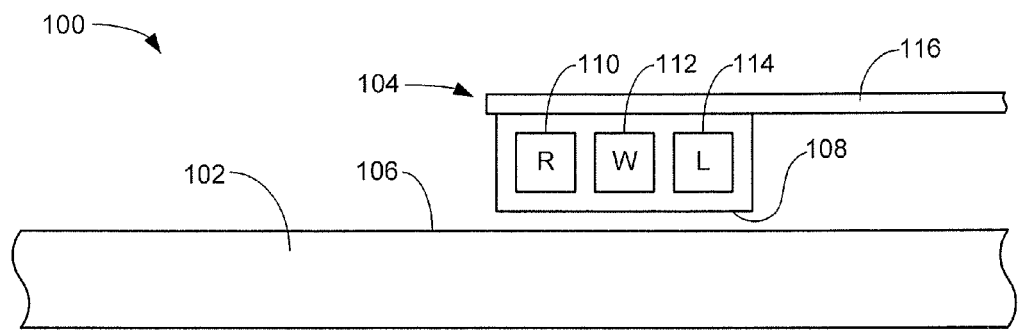
FIG. 1 depicts an example data storage system in accordance with some embodiments.

Assorted structures and methods are directed to a three dimensional magnetic recording (3DMR) medium that utilizes discreet data tracks in vertically stacked recording layers to provide optimized data storage performance.

A multilevel magnetic recording structure with multiple continuous magnetic layers can suffer from write field inflation. Assorted embodiments mitigate write inflation within a vertically stacked multi-level recording lamination. The use of discreet track recording with individual magnetic tracks that are physically isolated from each other reduces magnetic interaction between data tracks and optimizes data storage performance.

A method, in some embodiments, addresses write inflation issues by patterning discreet tracks in one or more magnetic layers. As a result, physical isolation between magnetic tracks reduces interaction between data tracks during magnetic recording. Additionally, fabrication is simplified compared to bit patterned media based multilevel recording media.

Write-assisted technologies, such as heat assisted magnetic recording (HAMR), microwave assisted magnetic recording (MAMR), as well as bit patterned media (BPM) are competing with extensions to perpendicular recording, such as shingled magnetic recording (SMR), and multi-track methods (TDMR), to be implemented into magnetic recording systems that provide high density information storage at densities greater than 1 terabit/square inch.

Many of these technologies rely upon increasing the gradient of some physical property that can be used to define sharper bit transitions. These technologies attempt to utilize such a high gradient mechanism as will be discussed, but at the same time each technology struggles to control the anisotropy of those properties so as to define the desired 3 dimensional bit structure.

HAMR uses the fact that magnetic anisotropy gradient near the Curie temperature can be much higher than magnetic field gradient. However, it is difficult to control the near-field transmission of heat into the recording layer as well as the anisotropic thermal diffusion within the magnetic layers and full stack structure so as to avoid lateral heat transport that lowers thermal gradient between grains and thus bits. For example, a so-called coupled granular and continuous (CGC) design with a dense, corrosion resistant, highly laterally coupled top layer. Unfortunately, such a material generally has more isotropic thermal diffusion that causes lateral spreading of the laser heating spot and can significantly reduce thermal gradient and recording density.

MAMR uses local resonance between a small microwave oscillator and the magnetic spins at the top of the recording layer to assist local writing and increase effective gradient. However, the MAMR effect is very sensitive to the surface layer spacing, thickness, damping, and microstructure, which may be very difficult to simultaneously optimize.

BPM on the other hand is very good at forming and controlling very sharp composition gradients. However, BPM media utilizes formation of patterned arrays of spaced magnetic pillars or particles with center-to-center spacing in the range of about 10-30 nm. To fully utilize BPM the particle size, particle separation, particle position, particle crystallographic, magnetic, and microstructural properties, and interparticle interactions are carefully controlled to provide effective BPM recording media.

Many patterning procedures comprise depositing the desired magnetic material onto appropriate seed layers, often by sputter deposition, to produce a blanket thin film of a desired structure and composition. The material is then patterned into the desired pillar structure by removing magnetic material in regions between the desired pillar locations. Such removal is generally performed by ion beam etching through a mask to selectively remove material in desired locations.

Unfortunately, the patterning process has several problems. The selectivity of the etching process is not perfect. Thus, the sensitive magnetic properties of the recording layer can be damaged by stray ion implantation at the pillar edges as well as through the mask. The etch process generally has limited aspect ratio, and normally has to be greater than 10 nm deep, to remove the entire magnetic layer. This causes more damage to the top of the pillars and limits the position control and isolation of very small-scale pattern features. This process results in a larger than desired variation of feature sizes that increases with the depth of the pattern feature. A further problem with BPM is the macroscopic locating of the bit positions, unlike the other technologies that employ a blanket coating of randomly dispersed grains or particles.

A 3DMR recording lamination, in some embodiments, consists of a top CoPt based BPM layer overlaid on top of a continuous HAMR media. Patterning of the top BPM layer can be accomplished through a top down etching process or a bottom up growth process through sputter deposition at points predefined in a thin seedlayer. The bottom up approach may reduce topography due to the self-planarization effect of the sputter growth process.

In a non-limiting embodiment, a bottom recording layer is configured as a continuous magnetic layer and a top recording layer is configured as a BPM layer. The combination of BPM and continuous magnetic layers can reduce, if not eliminate, write field inflation by utilizing two different recording systems. The BPM layer can be a CoPt based material and the continuous magnetic layer can be a FePt based material. Hence, various embodiments configure a patterned transmission layer of a FePt alloy L10 material that does not require segregants that may inhibit transmission. The patterned layer may be less than 2 nm thick so as to minimize tribological issues. The patterned layer may be formed "top-down" or "bottom up."

Various embodiments construct the BPM layer with top-down or bottom-up patterning. The CoPt BPM island material can decrease HAMR writing heat due to higher magnetic field occurring directly below the BPM dots. The BPM islands further focuses head and magnetic field to the underlying continuous magnetic layer.

Recording on the BPM can be achieved at a relatively low field at an areal density defined by the patterning process. Writing on the bottom FePt layer at a higher magnetic field occurs directly below CoPt dots through heat assisted magnetic recording. In this case, the thermal gradient of the heat source rather than the magnetic field gradient defines the resolution of the recording. As a result, the individual dot in the top BPM acts as a conduit for magnetic flux and heat required for writing the bottom FePt layer. The required heat for writing can be lowered by as much as 4 times compared to conventional HAMR. Also, an individual dot can act as a heat and magnetic field guide resulting in the heat flow and field being focused onto a narrow spot on the HAMR layer thus mitigating any inflation effects. This guiding effect can facilitate higher density recording in the HAMR media.

Patterning only the top magnetic layer simplifies the fabrication process compared to patterning both magnetic layers as disclosed in various prior arts. As such, various embodiments avoid patterning of FePt which may be more susceptible to etching damage.

In some embodiments, a 3DMR medium has dual BPM layers. When multiple BPM layers are stacked, the increased overall BPM thickness presents a fabrication challenge due, at least partially, to patterning high aspect-ratio (depth vs. width) islands constructed with top-down lithographic patterning. Various embodiments utilize a combination of top-down and bottom-up fabrication processing for respective first and second BPM recording layers allows the bottom BPM recording layer to act like a template.

For example, the bottom layer can be patterned by top-down fabrication process prior to a top BPM recording layer being deposited thereon and patterned with bottom-up processing using a segregate. This eliminates the requirement of patterning high aspect-ratio islands by top-down only method. As a result, the final topography of a 3DMR medium after the template growth of the top BPM recording layer is significantly reduced compared with the structure by top-down only method, eliminating or reducing the need for planarization.

A 3DMR medium, in some embodiments, may employ a first very thin and lower moment magnetically very hard magnetic layer vertically adjacent but not strongly magnetically coupled to a second higher moment, magnetically less hard but still thermally stable magnetic layer. Such configuration can define a magnetic bit having up to 4 separate magnetization levels as opposed to the standard 2-level system. Unfortunately, it is difficult to maintain a good laterally decoupled grain microstructure of both recording layers having very different anisotropy material and a nonmagnetic vertical decoupling layer.

For 3DMR media, several embodiments combine patterning technology with other data storage technologies. First, the difficulties of maintaining the microstructure of the top magnetic layer by other means can be removed. One embodiment involves a decoupled first recording layer, a nonmagnetic spacer, and orientation layer for a second recording layer, and a second thin recording layer that is deposited without decoupling, but then patterned at a fine scale so as to decouple the top layer.

In some embodiments, the top layer is a hard Co-alloy layer, a multilayer, a MAMR layer, or a HAMR layer. A non-limiting embodiment comprises a HAMR layer that may be stable at 5 nm or less, enabling efficient patterning, minimizing spacing loss to the bottom layer, and avoiding an extremely difficult growth problem. Another embodiment consists of a multilayer and a HAMR layer as the multilayer anisotropy does not require a growth orientation, simplifying design of the vertical decoupling interlayer. In some embodiments, atomic layer deposition (ALD) is used to fill the patterned trenches with nonmagnetic material.

In some embodiments, the patterned layer is covered with a continuous layer for mechanical improvement and to tune an optimized lateral exchange coupling. In some embodiments, the nonmagnetic region is formed by patterned ion irradiation so as to avoid pattern topography. In yet other embodiments, 3DMR is employed together with patterning at a size scale appropriate for BPM. In such embodiments, both recording layers made be deposited without concern for intergranular decoupling materials.

For HAMR media, several embodiments utilize a combination of patterning technology with other data storage technologies. One embodiment comprises a thin top layer of the recording layer that is then patterned at a fine scale so as to reduce or eliminate lateral heat transport in the top layer. The pattern may comprise standard ion etching or ion implantation to cause amorphization, or further comprise ALD to fill trenches with low thermal diffusion material.

Another embodiment recognizes that heat transmission into the recording layer is highly spacing dependent, and further patterns a thin layer of material that thus patterns regions of increased transmission efficiency. In yet other embodiments, HAMR is employed together with patterning at a size scale appropriate for BPM. In such embodiments, the recording layer may be deposited without concern for intergranular decoupling and thermal properties of the recording materials.

For MAMR media, several embodiments combine patterning technology with other recording technology. One embodiment comprises a thin top layer of the recording layer that is then patterned at a fine scale so as to employ a material with optimal resonance properties, while lateral properties such as exchange coupling can be controlled by the trenches. The pattern may comprise standard ion etching or ion implantation to cause amorphization, or further comprise ALD to fill trenches with low coupling material.

Another embodiment recognizes that the resonance into the recording layer is highly dependent on spacing between oscillator and low damping magnetic material regions. Thus, a patterned thin layer of such material also patterns regions hard and easy writability. In yet other embodiments, HAMR is employed together with patterning at a size scale appropriate for BPM. In such embodiments, the recording layer made be deposited without concern for intergranular decoupling and thermal properties of the recording materials.

Various embodiments configure a 3DMR media with patterning technology on only a thinner layer of the recording layer film as opposed to a full recording layer thickness pattern. In other embodiments, a layer is patterned with concern for short-range order, which makes a 1-to-1 correspondence between pattern features and bits unnecessary. One embodiment comprises a decoupled first recording layer, a nonmagnetic spacer and orientation layer for the second recording layer, and a second thin recording layer that is deposited without decoupling, but then patterned at a fine scale so as to decouple the top layer. In some embodiments, the top layer is a hard Co-alloy layer, a multilayer, a MAMR layer, or a HAMR layer.

These and other features of various embodiments can be understood beginning with a review of FIG. 1, which represents aspects of a data storage system 100. The system 100 has a rotatable data recording medium 102 and an adjacent data transducer 104. Generally, the medium 102 and the transducer 104 may be incorporated into a hard disc drive (HDD) or other data storage device in which multiple axially arranged recording media (discs) and HAMR data transducers are used to read and write user data from a host device.

Data is stored on the medium 102 along a number of concentric tracks (not shown) defined along a surface 106 of the medium. The data may be stored in the form of addressable user data sectors of fixed size along the tracks. Hydrodynamic features (such as an air bearing surface 108) may be provisioned on a facing surface of the transducer 104 to enable the transducer to be fluidically supported in close proximity to the medium surface 106 by atmospheric currents established during rotation of the medium 102.

The data transducer 104 is shown to include respective read (R), write (W) and light source (L) elements 110, 112 and 114. The read element 110 may take the form of a magneto-resistive (MR) sensor. The write element 112 may include a write coil and one or more magnetically permeable cores. The light source 114 may take the form of a laser diode, a near field transistor (NFT), or other radiation beam and/or thermal energy source.

During a read operation, the read element 110 operates to sense a magnetization sequence written to the medium 102 along a portion of a selected track. During a write operation, the light source element 114 projects a high powered irradiation "dot" on the rotating medium 102 to locally increase the temperature of the medium, and the write element 112 directs magnetic flux into the heated portions of the medium to write a desired magnetization sequence. The transducer 104 is supported by an actuator arm 116, which, responsive to a servo control system (not shown), radially positions the respective elements 110, 112 and 114 adjacent the disc surface 106 as required.

It will be appreciated that the system represented in FIG. 1 can be readily adapted for a non-HAMR application, in which case the light source element 114 is omitted. For instance, the light element 114 can be replaced by a frequency generator, such as a spin torque oscillator, for MAMR use. It has been found, for example, that formulations of media as disclosed herein are suitable for use in a wide variety of media, such as ECC+CGC perpendicular recording media.

HAMR locally applies heat from a near-field transducer (NFT) to raise the temperature of selected media regions toward the Curie temperature (Tc) so as to lower write field and form a sharp effective field gradient from a broader and low gradient actual magnetic field applied during heating. The effectiveness of HAMR can depend on the ability to produce a very sharp temperature gradient in the recording layer. Such gradient is degraded by thermal diffusion inherent in the recording materials and microstructures developed.

HAMR recording could be optimized by better confining laser heat and reducing lateral heat diffusion in the recording media. The heat transmission of an NFT across the head-media gap is sensitive to material and spacing. A thin patterned layer can therefore provide patterned regions providing high transmission surrounded by regions of both low transmission and near zero lateral heat diffusion (eg., dielectric or no material at all).

HAMR recording techniques such as depicted in FIG. 1 allows the use of high anisotropy medium magnetic materials such as iron-platinum (FePt) alloys. As noted above, the HAMR light source provides localized heating to temporarily reduce the anisotropy energy of the magnetic bit locations in the medium so that the electromagnetic writer element can write to the bit locations. The light beam in a HAMR application will tend to be many times smaller than its diffraction limit to avoid undesirable heating of adjacent areas, while the power level of the beam needs to be sufficiently high to accomplish the task of reducing the medium magnetic anisotropy energy.

Figure 2:
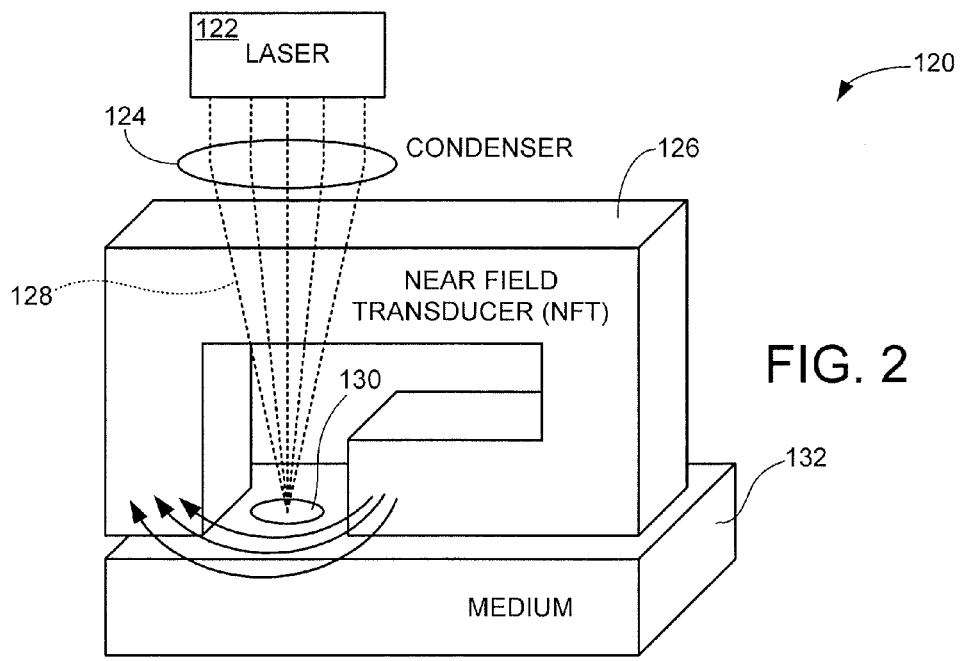
FIG. 2 illustrates an example HAMR data writer system suitable for use in the data storage system of FIG. 1.

Near field transducers (NFTs) are sometimes used to meet these beam size and power level requirements. FIG. 2 represents an NFT-based HAMR system 120 with a light source (e.g., incident laser) 122, a condenser 124 and an NFT 126. The condenser 124 represents a first stage and the NFT 126 represents a second stage. These elements cooperate to direct an electromagnetic radiation (e.g., light) beam 128 onto a small spot 130 on a medium 132. It is contemplated that the spot has a diameter of no more than about 30 nm and is provided with sufficient transmitted power as to reduce the magnetic coercivity and anisotropy energy of the medium.

The NFT 126 enhances the light efficiency by combining various effects such as plasmonic resonance, surface enhancement, lightening rod collection, etc. Using an enhanced overcoat layer on the medium 132 with high efficiency plasmon response characteristics, as disclosed herein, can further improve the laser-medium coupling efficiency during HAMR recording operations.

Figure 3:
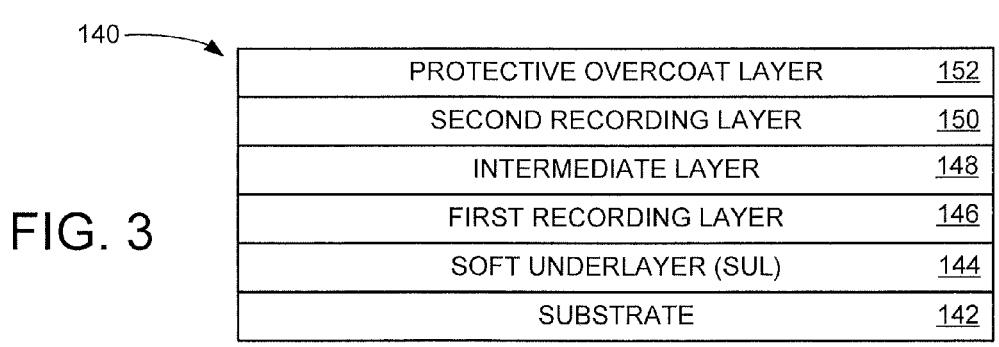
FIG. 3 displays a line representation of a portion of an example data storage medium constructed and operated in accordance with some embodiments.

FIG. 3 is a schematic depiction of various layers of an example recording medium 140 useful in a data storage system such as described above in FIGS. 1 and 2. Other media configurations can readily be used, including configurations with different numbers and/or orderings of layers. It will be appreciated that FIG. 3 is functional in nature and is not drawn to scale so that each of the respective layers shown in FIG. 3 will have its own respective thickness. Each layer may be formed from a plurality of layers of like or different construction. Seed layers, intermediate layers, coupling layers, etc. may also be used as desired.

A base substrate 142 provides mechanical support for the medium 140. A recording structure is formed on the base substrate 142 made up of a number of layers. A soft magnetic underlayer (SUL) 144 is formed on the substrate, such as via sputtering. The SUL 144 provides a return path for magnetic flux during a data recording operation. One or more intermediate layers, also referred to as interlayers (IL), can be formed on the SUL to establish a magnetic easy axis in the perpendicular direction, and may have high surface roughness to induce grain separation in the subsequently deposited recording layers. In some embodiments, a first recording layer 146 is positioned atop the SUL and consist of a first type of data recording, such as perpendicular recording, MAMR, HAMR, and BPM.

One or more intermediate layers 148 are formed on the first recording layer 146 to separate the second recording layer 150 from the first recording layer 146. The respective recording layers 146 and 150 may be provided with lower layers having relatively higher magnetization, anisotropy and exchange coupling levels and upper layers with softer magnetization and anisotropy. The second recording layer 150, in some embodiments, is configured with a different type of data recording than the first recording layer. As such, any number of suitable recording structure configurations can be used in the recording layers 146 and 150.

A protective overcoat layer 152 is formed on the topmost recording layer 150. Various configurations of the protective overcoat layer 152 protects the medium 140 against environmental effects, such as inadvertent contact between the medium 140 and the transducer (e.g., 104 in FIG. 1). The overcoat layer 152 can further provide increased energy coupling between the medium 140 and a HAMR recording system such as discussed in FIG. 2.

Figure 4:
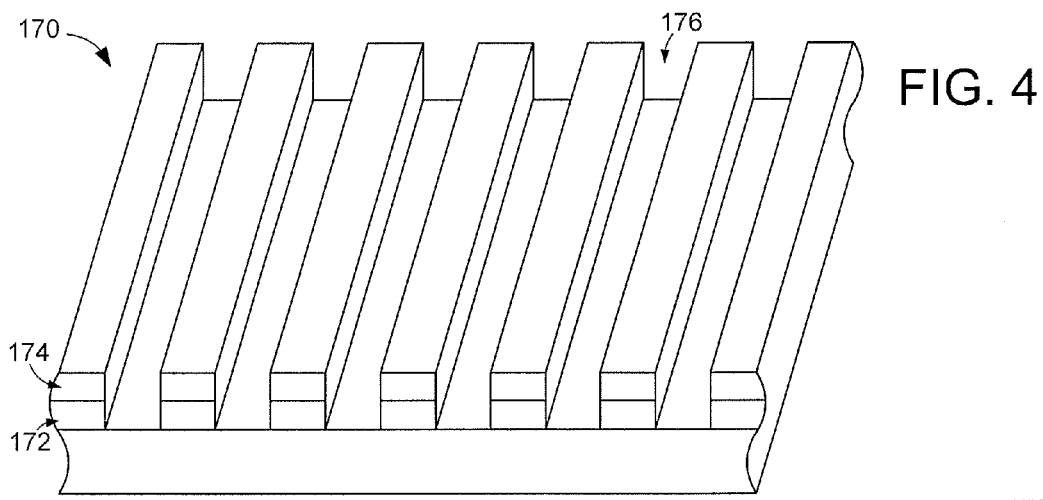
FIG. 4 is a line representation of a portion of an example data storage medium that can be utilized in the data storage system of FIG. 1.

FIG. 4 illustrates a line representation of a portion of an example data storage medium 170 constructed and operated in accordance with various embodiments. As shown, each recording layer 172 and 174 is vertically aligned and horizontally separated by a trench 176, which can be characterized as a discrete track. It is noted that an unlimited variety of fabrication techniques can be utilized to create the data storage medium 170 of FIG. 4. However, some embodiments pattern and subsequently etch the recording layers 172 and 174, which may be similar or dissimilar materials.

The patterned trenches 176 can serve as discrete tracks into both the recording layers 172 and 174. The recording layers 172 and 174 can individually or collectively be constructed of CoPt and FePt based magnetic materials. For example, the bottom recording layer 172 can be a CoPt based material and the top recording layer 174 can be a FePt based magnetic material.

The non-limiting configuration of FIG. 4 mitigates write field inflation in a crosstrack direction by facilitating thermal field confinement in the crosstrack direction and allowing higher density recording in the bottom recording layer 172.

Figure 5:
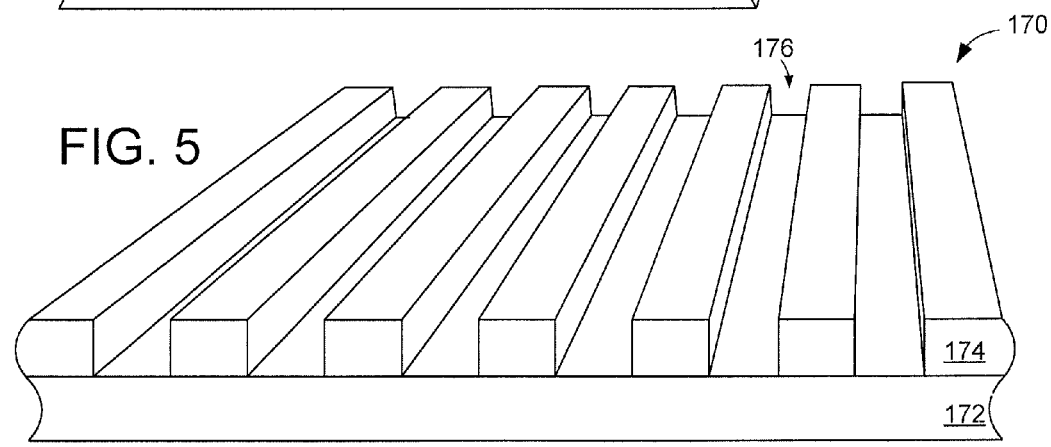
FIG. 5 shows a line representation of a portion of an example data storage medium configured in accordance with various embodiments.

It is contemplated that one or more trenches 176 can extend only through the top recording layer 174 with each bottom recording region 178 separated by a non-magnetic material, as shown in FIG. 5. Configuring the trenches 176 to extend through one recording layer 174 provides simpler fabrication and reduced topography for improved transducing head flyability. Also, possible patterning induced damage to the bottom layer is avoided. Confinement of thermal flow and magnetic flux in the crosstrack direction is also provided by the more shallow discreet tracks 176 of FIG. 5.

Figure 6:
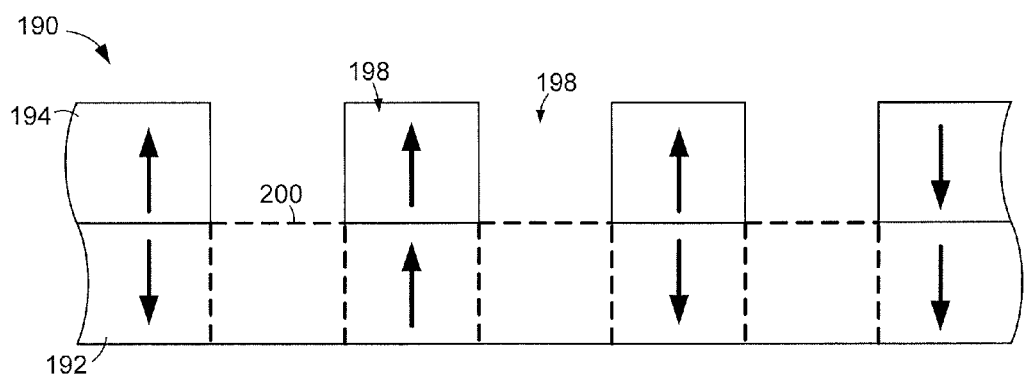
FIG. 6 provides line representation of a portion of an example data storage medium that can be used in the data storage system of FIG. 1.

FIG. 6 displays a cross-sectional line representation of a portion of an example data storage medium 190 configured in accordance with various embodiments to have first 192 and second 194 vertically stacked recording layers with magnetic regions 196 physically separated by a trench 198 that acts as a discreet data track. Segmented lines 200 illustrate how non-magnetic material can partially fill a trench 198 to tune the physical and magnetic characteristics of the data storage medium 190.

Figure 7A:
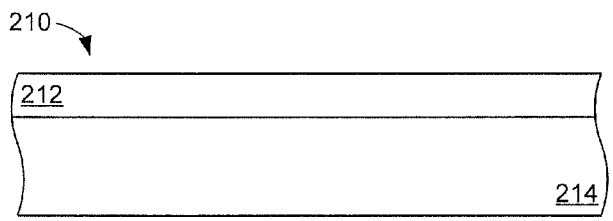
FIGS. 7A-7C respectively represent an example data storage medium constructed and operated in accordance with assorted embodiments.
Figure 7B:
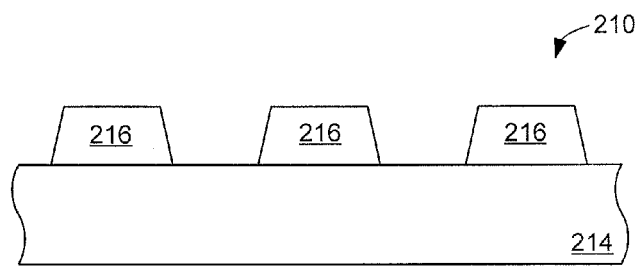
Figure 7C:
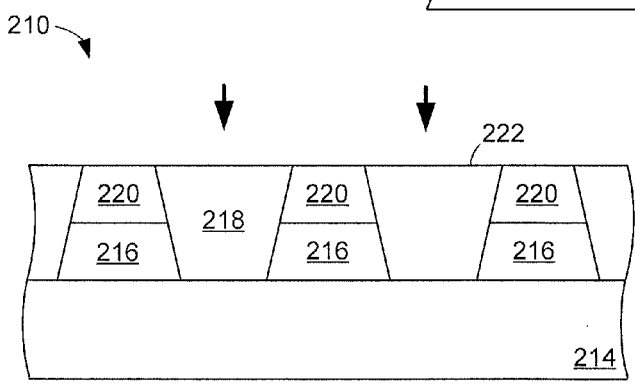

FIGS. 7A, 7B, and 7C respectively show cross-sectional line representations of portions of an example data storage medium 210 constructed in accordance with some embodiments. In FIG. 7A, a continuous magnetic layer 212 is deposited atop an underlayer 214, which may be a magnetic or non-magnetic material. The continuous magnetic layer 212 is subsequently patterned into multiple magnetic islands 216 that are physically separated and horizontally aligned. Top-down fabrication of the magnetic islands 216 can correspond with various patterning techniques, such as etching or polishing, that result in creating the respective islands 216 with rectangular, rhomboid, or partially curvilinear shapes.

FIG. 7C illustrates how co-sputtering of a magnetic alloy that makes up a second magnetic recording layer 218 consisting of a second group of separate and horizontally aligned magnetic islands 220. It can be appreciated that alignment of the first and second groups of magnetic islands 216 and 220 can be difficult and/or time-consuming when top-down, or bottom-up, fabrication processes are utilized. However, by employing bottom-up fabrication for the second magnetic recording layer 218, such as sputtering and chemical vapor deposition, the magnetic islands 216 and 220 can be efficiently aligned as the bottom islands 216 act as a template for the top islands 220. It is contemplated that each combined magnetic island has different recording layer materials and a non-magnetic material 222 can continuously or collectively separate the various island combinations of first 216 and second 220 materials.

Figure 8:
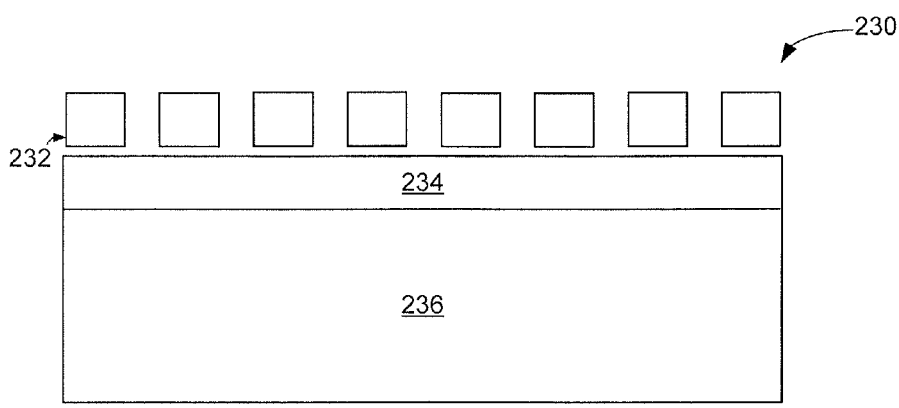
FIG. 8 displays a block representation of a portion of an example data storage medium that can be employed in the data storage system of FIG. 1.

FIG. 8 illustrates a line representation of a portion of an example data storage medium 230 constructed and operated in accordance with various embodiments. As shown, each recording layer 232 and 234 is configured with a different recording scheme and positioned atop at least one interlayer 236. While not required or limiting, the lower recording layer 234 is a continuous magnetic layer, which may be accessed by PMR, HAMR, or MAMR, and the upper recording layer 232 is a BPM structure.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a three dimensional magnetic recording medium having a first recording layer positioned atop a second recording layer, the first recording layer comprising a FePt material patterned with a plurality of magnetic islands each having a thickness of less than 2 nm, the magnetic islands physically separated into first and second data tracks by a discrete track in the first stacked recording layer, the second recording layer configured for energy assisted magnetic recording, the first and second data tracks being adjacent and each comprising the first and second recording layers.

2. The apparatus of claim 1, wherein the first and second recording layers are vertically stacked and aligned along a direction perpendicular to an air bearing surface (ABS).

3. The apparatus of claim 1, wherein the second recording layer is a continuous magnetic layer without a discrete track.

4. The apparatus of claim 1, wherein the first recording layer is configured as a bit patterned media with the magnetic islands separated by non-magnetic material.

5. The apparatus of claim 1, wherein the discrete track is filled with a non-magnetic material.

6. The apparatus of claim 1, wherein the first and second recording layers respectively have first and second thicknesses, each thickness measured perpendicular to an air bearing surface of the three dimensional magnetic recording medium, the first thickness being less than the second thickness.

7. The apparatus of claim 1, wherein the second recording layer is configured to record data via HAMR.

8. The apparatus of claim 1, wherein the second recording layer is configured to record data via MAMR.

9. An apparatus comprising a recording lamination comprising a first recording layer positioned atop a second recording layer, the first recording layer comprising a FePt material and patterned with a plurality of magnetic islands having a thickness of less than 2 nm, the second recording layer configured for energy assisted magnetic recording, the magnetic islands physically separated into first and second data tracks by a first discrete track and into third and fourth data tracks by a second discrete track, the first and second data tracks being adjacent and the third and fourth data tracks being adjacent, each data track comprising the first and second recording layers.

10. The apparatus of claim 9, wherein the first recording layer is closer to an air bearing surface of the recording lamination than the second recording layer.

11. The apparatus of claim 9, wherein the energy assisted magnetic recording comprises HAMR.

12. The apparatus of claim 9, wherein the energy assisted magnetic recording comprises MAMR.

13. The apparatus of claim 9, wherein each magnetic islands comprises a CoPt based material.

14. An apparatus comprising a three dimensional magnetic recording medium having a first bit patterned media (BPM) layer disposed between a second BPM layer and a substrate, the first and second BPM layers each having magnetic islands separated by a non-magnetic material, the magnetic islands physically separated into first and second data tracks by a discrete track in the first stacked recording layer, the second BPM layer positioned atop the first BPM layer, the second BPM layer comprising a FePt material having a thickness of less than 2 nm, the first BPM layer configured for energy assisted magnetic recording the first and second data tracks being adjacent and each comprising the first and second BPM layers.

15. The apparatus of claim 14, wherein the magnetic islands of the first BPM layer comprise a different material than the magnetic islands of the second BPM layer.

16. The apparatus of claim 14, wherein each magnetic island of each recording layer is surrounded by non-magnetic material.

17. The apparatus of claim 14, wherein the magnetic islands of the first and second BPM layers being vertically aligned.

18. The apparatus of claim 14, wherein at least one interlayer is positioned between the substrate and the first BPM layer.

19. The apparatus of claim 14, wherein the magnetic islands of each BPM layer can concurrently store different magnetic polarities.

* * * * *